(12) United States Patent
Williamson et al.

(10) Patent No.: US 7,063,101 B2
(45) Date of Patent: Jun. 20, 2006

(54) FUEL TANK VENT SYSTEM

(75) Inventors: Brian J. Williamson, Hagerstown, IN (US); Michael S. Brock, Connersville, IN (US); J Bradley Groom, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 133 days.

(21) Appl. No.: 10/903,422

(22) Filed: Jul. 30, 2004

(65) Prior Publication Data

US 2005/0022898 A1 Feb. 3, 2005

Related U.S. Application Data

(60) Provisional application No. 60/491,755, filed on Aug. 1, 2003.

(51) Int. Cl.
*F16K 24/04* (2006.01)

(52) U.S. Cl. ......................................... 137/202; 137/43

(58) Field of Classification Search ................ 137/202, 137/43
See application file for complete search history.

(56) References Cited

U.S. PATENT DOCUMENTS

| 5,028,244 | A | * | 7/1991 | Szlaga ........................ 137/202 |
| 5,116,257 | A | | 5/1992 | Szlaga |
| 5,590,697 | A | | 1/1997 | Benjey et al. |
| 5,694,968 | A | | 12/1997 | Devall et al. |
| 5,782,258 | A | | 7/1998 | Herbon et al. |
| 5,797,434 | A | | 8/1998 | Benjey et al. |
| 5,944,044 | A | | 8/1999 | King et al. |
| 5,992,441 | A | | 11/1999 | Enge et al. |
| 6,170,510 | B1 | | 1/2001 | King et al. |
| 6,240,950 | B1 | | 6/2001 | Harris |
| 6,405,747 | B1 | | 6/2002 | King et al. |
| 6,578,597 | B1 | * | 6/2003 | Groom et al. ................ 137/43 |
| 6,675,779 | B1 | | 1/2004 | King et al. |
| 6,701,950 | B1 | | 3/2004 | Brock et al. |
| 6,866,058 | B1 | * | 3/2005 | Brock et al. ................ 137/202 |
| 2002/0144730 | A1 | | 10/2002 | Brock et al. |

* cited by examiner

*Primary Examiner*—Kevin Lee
(74) *Attorney, Agent, or Firm*—Barnes & Thornburg LLP

(57) ABSTRACT

A fuel tank vent system includes a fuel vapor vent apparatus and a vent controller. The fuel vapor vent apparatus is adapted to be coupled to a fuel tank. The vent controller is coupled to the fuel vapor vent apparatus and configured to control flow of fuel vapor from the fuel tank through the fuel vapor vent apparatus to a destination outside the fuel tank.

30 Claims, 5 Drawing Sheets

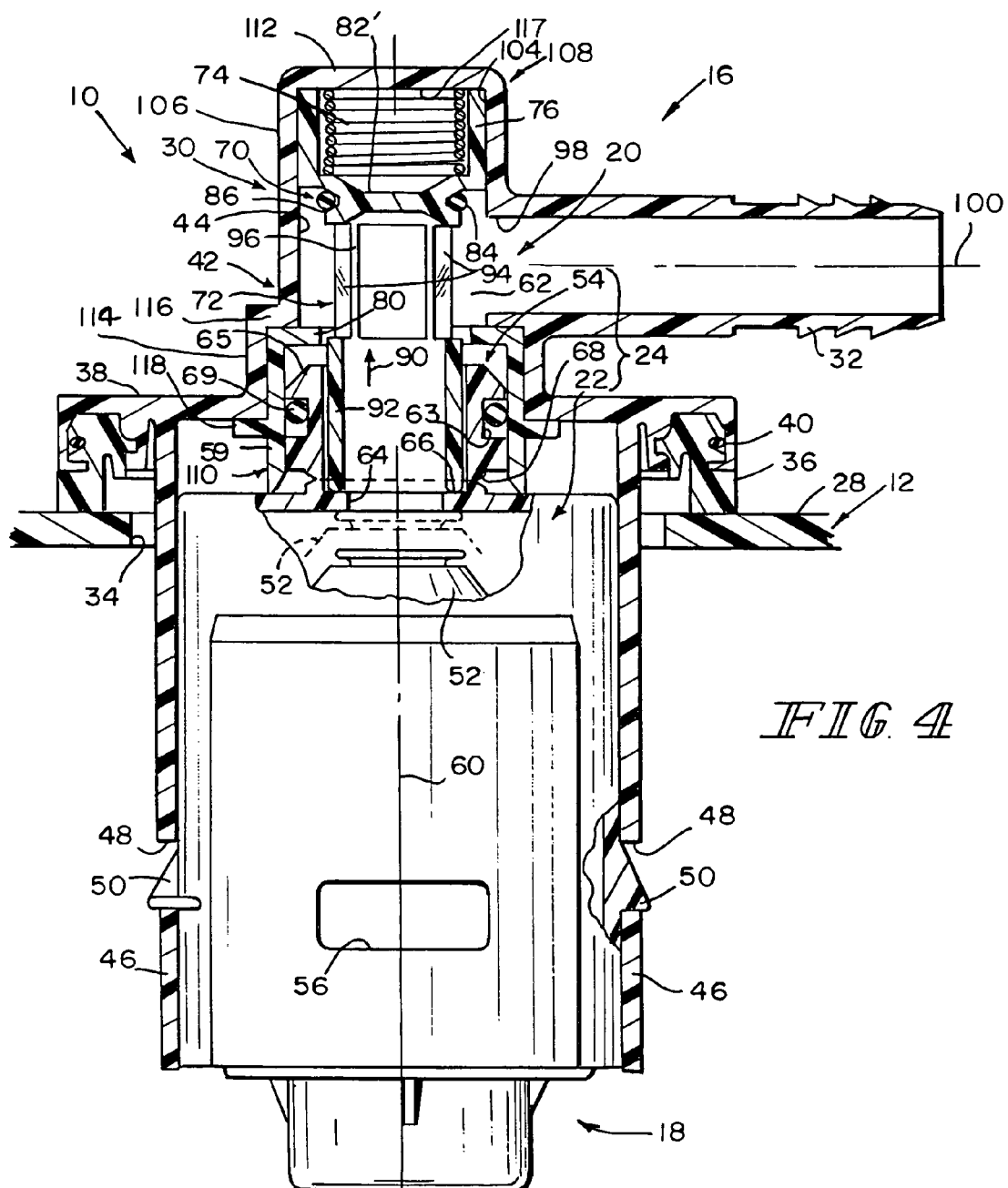

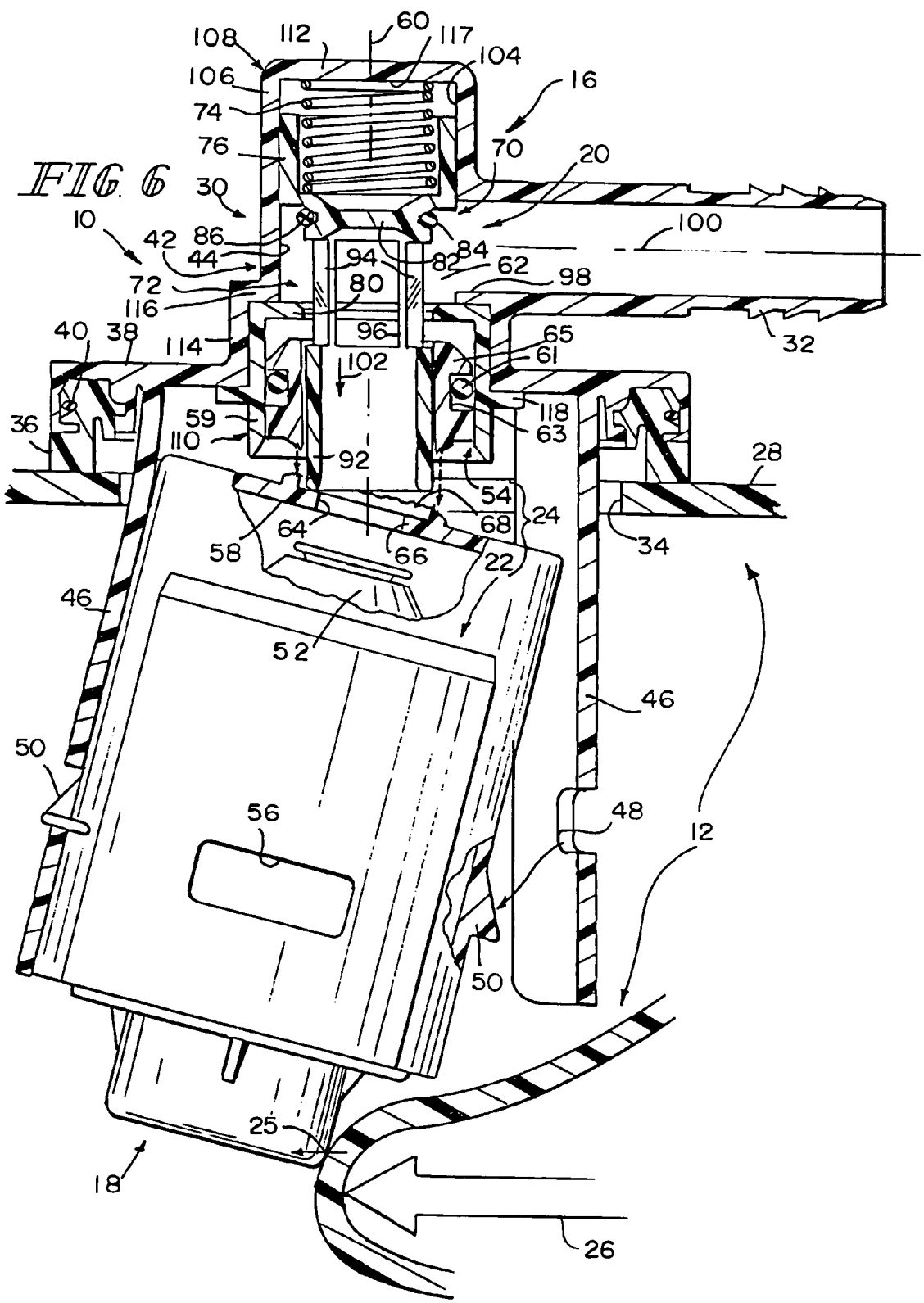

FUEL TANK VENT SYSTEM

This application claims priority under 35 U.S. C. § 119(e) to U.S. Provisional Patent Application No. 60/491,755 which was filed on Aug. 1, 2003 and is hereby incorporated by reference herein.

BACKGROUND

The present disclosure relates to a fuel tank vent system. More particularly, the present disclosure relates to a fuel tank vent system for regulating discharge of fuel vapor and liquid fuel from a fuel tank.

Vehicle fuel systems include fuel tanks and various valves for venting pressurized fuel vapor from the tank to a fuel vapor recovery canister onboard the vehicle. Roll-over valves and fill-limit valves are examples of fuel system valves included in vehicle fuel systems. The canister is designed to capture and store hydrocarbons entrained in fuel vapors that are displaced and generated in the fuel tank during a typical vehicle refueling operation or that are otherwise vented from the fuel tank.

SUMMARY

In accordance with the present disclosure, a fuel tank vent system includes a fuel vapor vent apparatus, a first vent controller, and a second vent controller. The fuel vapor vent apparatus is adapted to be coupled to a fuel tank to discharge fuel vapor located in the fuel tank to a destination (e.g., fuel vapor recovery canister) outside the fuel tank. The first vent controller includes a controller housing coupled to the fuel vapor vent apparatus and a first valve positioned in the controller housing and adapted to control discharge of fuel vapor from the fuel tank through the fuel vapor vent apparatus and block discharge of liquid fuel from the fuel tank through the fuel vapor vent apparatus.

The second vent controller includes a second valve. The second valve is arranged to move relative to the fuel vapor vent apparatus from an opened position allowing discharge of fuel vapor from the fuel tank through the fuel vapor vent apparatus to a closed position blocking discharge of fuel vapor and liquid fuel from the fuel tank through the fuel vapor vent apparatus in response to displacement of at least a portion of the controller housing relative to the fuel vapor vent apparatus due to application of a displacement force to the controller housing portion upon deformation of the fuel tank caused by an impact against the fuel tank.

The controller housing includes a frangible portion. The frangible portion is configured to break in response to displacement of the controller housing portion to make way for the second valve to move to the closed position.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 4 is a sectional view taken along lines 4—4 of FIG. 2 showing the first vent controller coupled to the fuel vapor vent apparatus to establish a sealed connection therebetween and to position a valve of the second vent controller in an opened position allowing discharge of fuel vapor from the fuel tank through an outlet passageway formed in the fuel vapor vent apparatus to the fuel vapor recovery canister;

FIG. 5 is an enlarged sectional view showing a frangible portion that is configured, for example, as an annular V-shaped groove formed in a controller housing of the first vent controller between a head portion of the controller housing and a body portion of the controller housing and that is configured to break in response to displacement of the body portion due to application of a displacement force to the body portion as shown, for example, in FIG. 6;

FIG. 6 is a sectional view similar to FIG. 4 showing downward movement of the valve by a spring in response to displacement of the body portion due to application of the displacement force to the body portion upon deformation of the fuel tank caused by an impact against the fuel tank.

DETAILED DESCRIPTION

Figure 1:
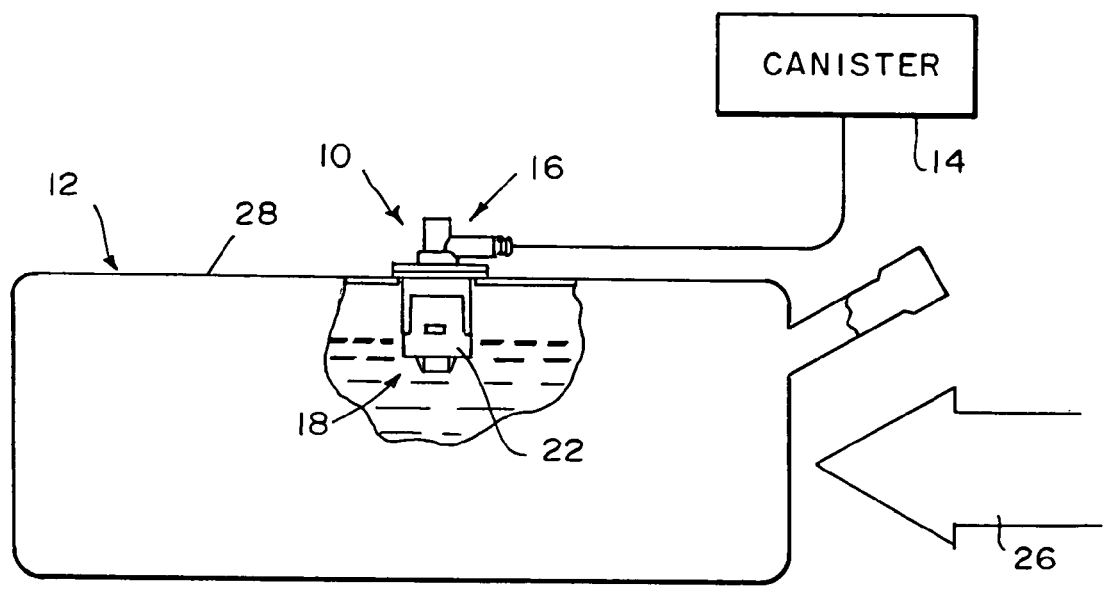
FIG. 1 is diagrammatic view showing a fuel tank vent system coupled to a fuel tank and positioned in a tank aperture formed in the fuel tank to control discharge of fuel vapor from the fuel tank to a fuel vapor recovery canister and block discharge of liquid fuel from the fuel tank.
Figure 2:
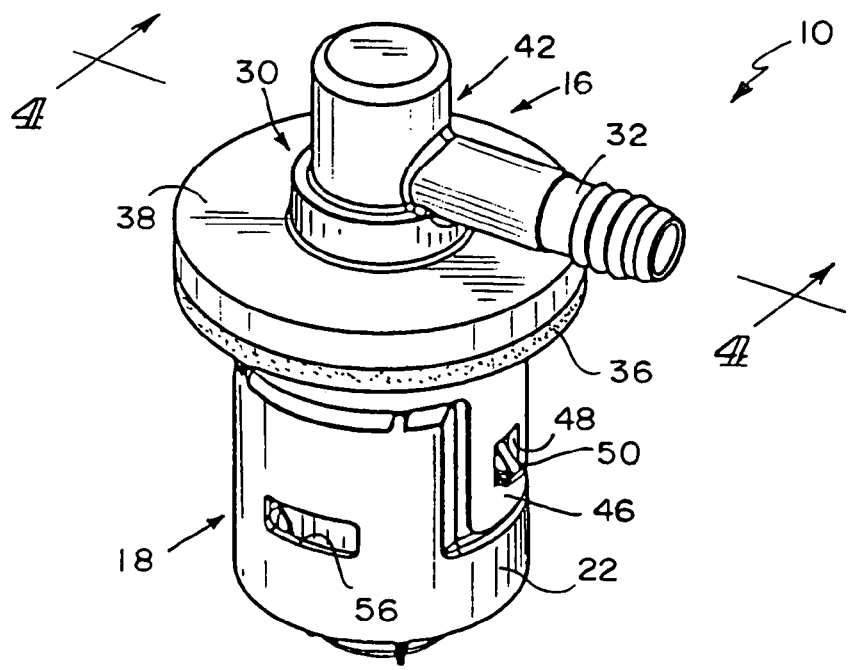
FIG. 2 is a perspective view of the fuel tank vent system showing a fuel vapor vent apparatus adapted to be coupled to the fuel tank and a first vent controller underlying and coupled to the fuel vapor vent apparatus to control discharge of fuel vapor from the fuel tank through the fuel vapor vent apparatus to the fuel vapor recovery canister.
Figure 3:
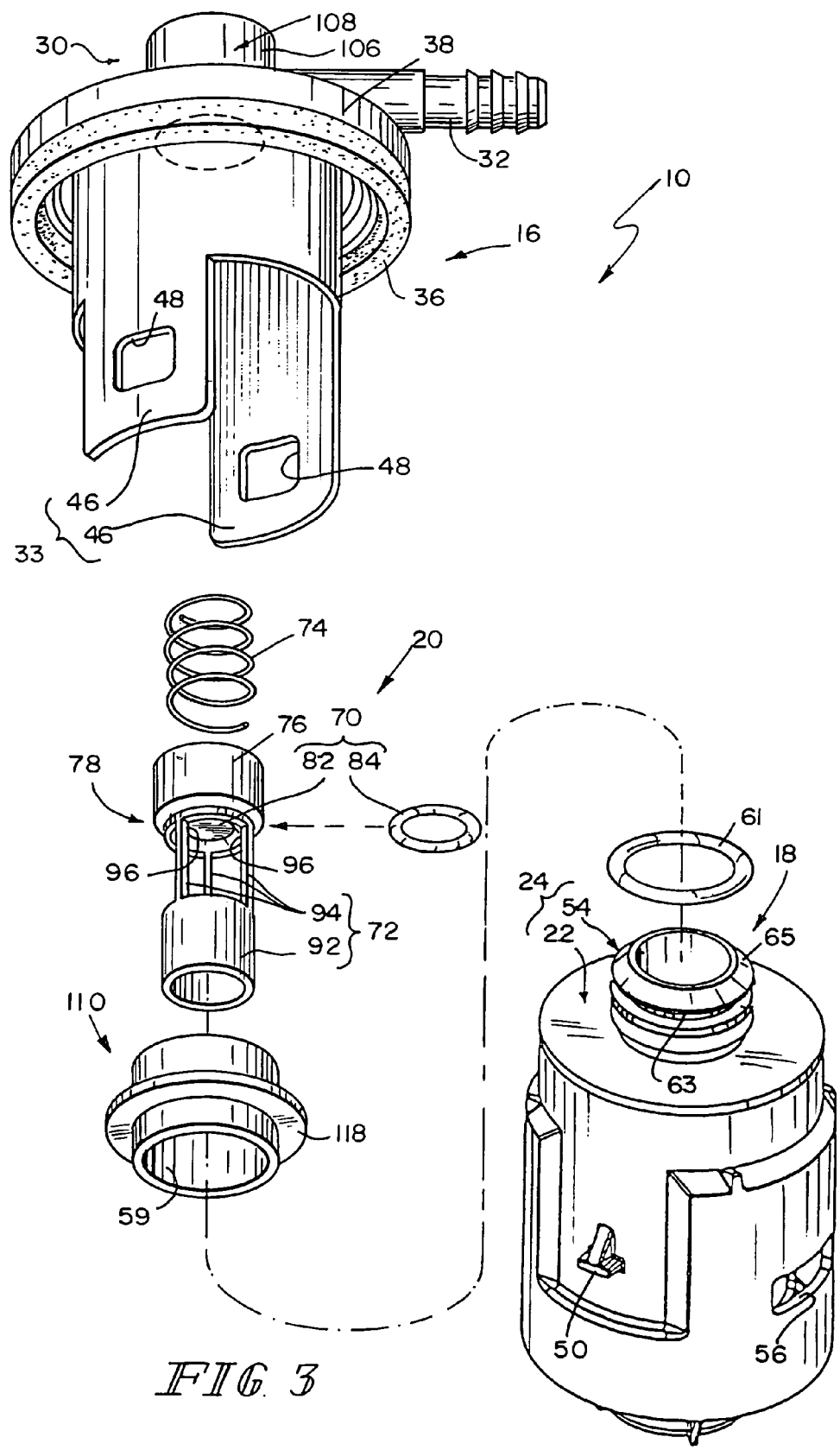
FIG. 3 is an exploded perspective view of the fuel tank vent system showing the fuel vapor vent apparatus at the top left of the page, the first vent controller at the bottom right of the page, and components of a second vent controller located between the fuel vapor vent apparatus and the first vent controller.

A fuel tank vent system 10 shown, for example, in FIGS. 1–3 is configured to control discharge of fuel vapor from a fuel tank 12 to a fuel vapor recovery canister 14 and to block discharge of liquid fuel from fuel tank 12 to canister 14. System 10 includes a fuel vapor vent apparatus 16, a first vent controller 18, and a second vent controller 20. Apparatus 16 is adapted to be coupled to tank 12 to discharge fuel vapor located in tank 12 to canister 14. First vent controller 18 is coupled to apparatus 16 normally to perform the task of controlling discharge of fuel vapor from tank 12 through apparatus 16 to canister 14, as shown, for example, in FIG. 4.

Figure 7:
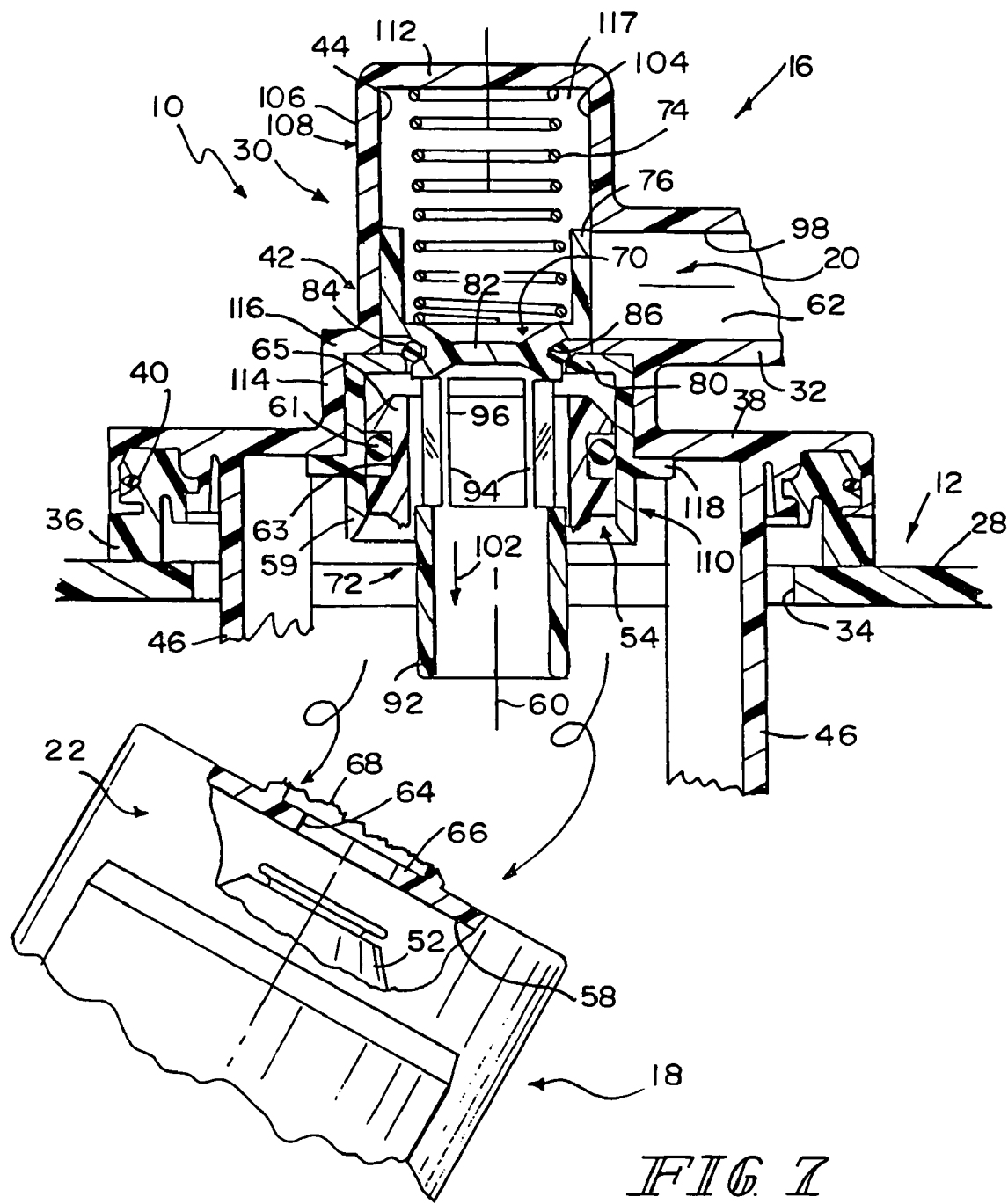
FIG. 7 is a sectional view similar to FIG. 6 showing the valve assuming a closed position blocking discharge of fuel vapor and liquid fuel through the fuel vapor vent apparatus in response to displacement of the body portion.

Second vent controller 20 acts as a back-up to first vent controller 18 to block discharge of fuel vapor and liquid fuel from tank 12 through apparatus 16 to canister 14 in the event that first vent controller 18 becomes disabled, as shown, for example, in FIGS. 6 and 7. Such disablement may occur during a vehicle crash situation in which tank 12 is impacted causing tank 12 (which may be made of plastics material) to deform and displace at least a portion 22 of a controller housing 24 of first vent controller 18. Second vent controller 20 thus provides means for blocking discharge of fuel vapor and liquid fuel from fuel tank 12 through fuel vapor vent apparatus 16 to an external destination outside tank 12 in response to displacement of at least portion 22 of controller housing 24 relative to fuel vapor vent apparatus 16 due to application of a displacement force 25 to portion 22 upon deformation of fuel tank 12 caused by an impact 26 against fuel tank 12.

Fuel vapor vent apparatus 16 is coupled to a top wall 28 of tank 12, as shown, for example, in FIG. 4. Apparatus 16 includes a cover 30, a tube 32 coupled to and extending horizontally from cover 30, and a controller mount 33 depending from cover 30.

Cover 30 is adapted to cover a tank aperture 34 formed in top wall 28, as shown, for example, in FIG. 4. Cover 30 includes a weldable cover mount 36 welded to top wall 28, an annular plate 38 coupled to mount 36, an O-ring 40 positioned between cover mount 36 and plate 38 to establish a sealed connection therebetween, and a container 42 coupled to plate 38 to contain components of second vent controller 20 in a chamber 44 formed in container 42.

First vent controller 18 is coupled normally to controller mount 33, as shown, for example, in FIG. 4. Controller mount 33 includes a pair of flexible arms 46 depending from plate 38. An lug-receiving aperture 48 formed in each arm 46 receives a lug 50 coupled to a body portion 22 of controller housing 24 to mount first vent controller 18 in place.

First vent controller 18 includes controller housing 24 and a first valve 52, as shown, for example, in FIG. 4. Controller housing 24 includes a head portion 54 and body portion 22. During coupling of first vent controller 18 to fuel vapor vent apparatus 16, head portion 54 is inserted into a mount sleeve 59 of apparatus 16 to establish a sealed connection therebetween by use of an O-ring 61 positioned in a ring-receiving groove 63 formed in a support sleeve 65. Body portion 22 is formed to include a pair of inlet apertures 56 and an interior region 58. Inlet apertures 56 are diametrically opposed to one another to admit fuel vapor and liquid fuel into interior region 58.

Valve 52 is positioned in interior region 56 for movement along a controller axis 60 between an opened position shown in solid in FIG. 4 and a closed position shown in phantom in FIG. 4 in response to a condition of fuel in tank 12. In the opened position, valve 52 allows discharge of fuel vapor from interior region 58 into an outlet passageway 62 formed in fuel vapor vent apparatus 16 through an outlet aperture 64 formed in a shoulder 66 included in body portion 22 and extending radially inwardly relative to head portion 54. In the closed position, valve 52 blocks discharge of fuel vapor and liquid fuel from interior region 58 into outlet passageway 62 through outlet aperture 64. The fuel condition to which valve 52 is responsive is, for example, the level of liquid fuel in tank 12, the level of liquid fuel in interior region 58, and/or the flow rate of liquid fuel through interior region 58.

Illustratively, first vent controller 18 is a fill limit vent valve apparatus configured to limit the amount of fuel allowed into tank 12. An example of such a fill limit vent valve apparatus is disclosed in U.S. Pat. No. 6,578,597, the disclosure of which is incorporated by reference herein. It is within the scope of this disclosure for first vent controller 18 to be a rollover valve apparatus configured to move to the closed position when the tank is turned upside down to block escape of liquid fuel from tank 12 or a grade valve apparatus configured to move to the closed position when tank 12 is inclined relative to a horizontal or during vehicle cornering to also block escape of liquid fuel from tank 12.

Controller housing 24 includes a frangible portion 68, as shown, for example, in FIG. 5. Frangible portion 68 is positioned between body portion 22 and head portion 54 to connect body portion 22 and head portion 54. Frangible portion 68 is configured to break in response to displacement of body portion 22 relative to head portion 54 and apparatus 16 to allow body portion 54 to separate from head portion 22 in response to displacement of body portion 22 relative to head portion 54 and fuel vapor vent apparatus 16, as shown, for example, in FIGS. 6 and 7. Frangible portion 68 thus provides means for allowing body portion 22 to separate from head portion 54 in response to displacement of body portion 22 relative to head portion 54 due to application of the displacement force 25 to body portion 22. As such, when body portion 22 is displaced, body portion 22 is removed from head portion 54 and lugs 50 are removed from lug-receiving apertures 48 allowing body portion 22 to fall away from fuel vapor vent apparatus 16. Illustratively, frangible portion 68 is an annular V-shaped groove.

Second vent controller 20 includes a second valve 70, a valve opener 72, a valve closer 74, and a follower 76, as shown, for example, in FIGS. 3, 4, 6, and 7. Valve 70, valve opener 72, and follower 76 cooperate to provide a shuttle 78.

Valve 70 is arranged to move along controller axis 60 relative to apparatus 16 between an opened position shown, for example, in FIG. 4 and a closed position shown, for example, in FIG. 7. In the opened position, valve 70 is spaced apart from an annular valve seat 80 to allow discharge of fuel vapor from tank 12 through outlet passageway 62 to canister 14. In the closed position, valve 70 contacts valve seat 80 to establish a sealed connection therebetween to block discharge of fuel vapor and liquid fuel from tank 12 through outlet passageway 62 to canister. Illustratively, valve 70 includes a disk 82 and an O-ring 84 positioned in a ring-receiving groove 86 formed in a peripheral portion of disk 82.

Valve opener 72 is arranged to engage first vent controller 18 to move valve 70 from the closed position to the opened position in a direction 90 when head portion 54 is inserted into mount sleeve 59 upon coupling of first vent controller 18 to fuel vapor vent apparatus 16, as shown, for example, in FIG. 4. Valve opener 72 thus provides valve opener means for moving second valve 70 from the closed position to the opened position in response to coupling of controller housing 24 to fuel vapor vent apparatus 16. Valve opener 72 depends from disk 82 and is positioned between valve 70 and first vent controller 18.

Illustratively, valve opener 72 includes an engagement sleeve 92 and three connector arms 94 connecting engagement sleeve 92 and disk 82 and cooperating with engagement sleeve 92 and disk 82 to form three opener apertures 96 therebetween, as shown, for example, in FIGS. 3 and 4. Engagement sleeve 92 is arranged to extend into support sleeve 65 to engage shoulder 66 to cause valve 70 to move from the closed position to the opened position when head portion 54 is inserted into mount sleeve 59. When valve 70 is in the opened position, fuel vapor is allowed to flow along controller axis 60 from interior region 58 through outlet aperture 64, engagement sleeve 92, and opener apertures 96. As the fuel vapor exits opener apertures 96, the fuel vapor turns about 90° to flow through a transition aperture 98 into tube 32 along a tube axis 100 of tube 32.

Valve closer 74 is arranged to move valve 70 along controller axis 60 in a direction 102 from the opened position to the closed position in response to displacement of body portion 22 relative to apparatus 16, as shown, for example, in FIGS. 6 and 7. Valve closer 74 thus provides valve closer means for moving second valve 70 from the opened position to the closed position in response to displacement of at least a portion 22 of controller housing 24 relative to fuel vapor vent apparatus 16. Illustratively, valve closer 74 is a spring.

Follower 76 is arranged to follow an interior surface 104 of an annular inner side wall 106 of apparatus 16 to guide movement of valve 70 along controller axis 60 between the opened and closed positions, as shown, for example, in FIGS. 4, 6, and 7. Illustratively, follower 76 is a follower sleeve that is coupled to and extends upwardly from the peripheral portion of disk 82, surrounds valve closer 74, and engages interior surface 104 to slide along surface 104.

Container 42 contains shuttle 78 and valve closer 74 in chamber 44 included in outlet passageway 62, as shown, for example, in FIGS. 4, 6, and 7. Container 42 includes a receiver 108 and a retainer 110. Receiver 108 receives shuttle 78 and valve closer 74 in chamber 44 and retainer 110 retains shuttle 78 and valve closer 74 therein.

Receiver 108 includes inner side wall 106, a top wall 112 coupled to inner side wall 106, an annular outer side wall 114, and an annular shoulder 116 connecting inner side wall 106, and outer side wall 114, as shown, for example, in FIGS. 4, 6, and 7. Inner side wall 106 extends upwardly from tube 32 to top wall 112 to define a space 117 between inner side wall 106 and top wall 112 to receive valve closer 74 therein.

Retainer 110 includes mount sleeve 59, valve seat 80 extending radially inwardly from mount sleeve 59, and an annular flange 118 extending radially outwardly from mount sleeve 59, as shown, for example, in FIGS. 4, 6, and 7. Mount sleeve 59 supports valve seat and thus acts as a seat mount. Mount sleeve 59 is coupled (e.g., hermetically welded) to outer side wall 114 and/or flange 116 is coupled (e.g., hermetically welded) to plate 38.

During assembly, second vent controller 20 is inserted into chamber 44 and retainer 110 is coupled to receiver 108. First vent controller 18 is coupled to fuel vapor vent apparatus 16 upon inserting lugs 50 into lug-receiving apertures 56 and inserting head portion 54 into mount sleeve 59 to establish a sealed connecting therebetween. When head portion 54 is inserted into mount sleeve 59, engagement between shoulder 66 and engagement sleeve 92 of valve opener 72 causes valve 70 to disengage valve seat 80 and move against valve closer 74 from its closed position to its opened position to open outlet passageway 62 to allow discharge of fuel vapor from fuel tank 12 through outlet passageway 62 to canister 14. Cover mount 36 is then welded to top wall 28 of tank 12.

During use of system 10, first vent controller 18 normally controls discharge of fuel vapor from tank 12 through passageway 62 to canister 14 and blocks discharge of liquid fuel from tank 12 through passageway 62 to canister 14. Second vent controller 20 closes outlet passageway 62 in the event that first vent controller 18 is disabled. Such disablement may occur due to an impact 26 against tank 12 causing deformation of a wall of tank 12. Such deformation of the tank wall may result in application of a displacement force 25 transverse to controller axis 60 causing displacement of body portion 22 relative to head portion 54 and fuel vapor vent apparatus 16. Frangible portion 68 is configured to break in response to such displacement of body portion 22 to allow body portion 22 to separate from head portion 54. When such separation occurs, valve closer 74 causes valve 70 to move along axis 60 from its opened position to its closed position to block discharge of fuel vapor and liquid fuel from tank 12 through tank aperture 34 and outlet passageway 62 to canister 14.

The invention claimed is:

1. A fuel tank vent system comprising
a fuel vapor vent apparatus adapted to be coupled to a fuel tank to discharge fuel vapor located in the fuel tank to an external destination outside the fuel tank,
a vent controller including a controller housing coupled to the fuel vapor vent apparatus and a first valve positioned in the controller housing and adapted to control discharge of fuel vapor from the fuel tank through the fuel vapor vent apparatus to the external destination and block discharge of liquid fuel from the fuel tank through the fuel vapor vent apparatus to the external destination, and
means for blocking discharge of fuel vapor and liquid fuel from the fuel tank through the fuel vapor vent apparatus to the external destination in response to displacement of at least a portion of the controller housing relative to the fuel vapor vent apparatus due to application of a displacement force to the at least the portion of the controller housing upon deformation of the fuel tank caused by an impact against the fuel tank.

2. The fuel tank vent system of claim 1, wherein the discharge-blocking means includes a second valve mounted for movement in the fuel vapor vent apparatus relative thereto between an opened position allowing discharge of fuel vapor from the fuel tank through the fuel vapor vent apparatus to the external destination when the controller housing is coupled to the fuel vapor vent apparatus and a closed position blocking discharge of fuel vapor and liquid fuel from the fuel tank through the fuel vapor vent apparatus to the external destination when the at least the portion of the controller housing is displaced relative to the fuel vapor vent apparatus.

3. The fuel tank vent system of claim 2, wherein the discharge-blocking means includes valve opener means for moving the second valve from the closed position to the opened position in response to coupling of the controller housing to the fuel vapor vent apparatus.

4. The fuel tank vent system of claim 2, wherein the discharge-blocking means includes valve closer means for moving the second valve from the opened position to the closed position in response to displacement of the at least the portion of the controller housing relative to the fuel vapor vent apparatus.

5. The fuel tank vent system of claim 2, wherein the discharge-blocking means includes a shuttle and a spring, the shuttle and the spring are arranged to move along an axis in a chamber formed in the fuel vapor vent apparatus, the shuttle includes the second valve, an engagement sleeve, and a plurality of connector arms that connect the second valve and the engagement sleeve and cooperate with the second valve and the engagement sleeve to form a plurality of first apertures therebetween, the controller housing includes a head portion and a body portion containing the first valve which is adapted to control flow through a second aperture formed in a shoulder included in the body portion, and a frangible portion located between the head portion and the body portion and configured to break in response to displacement of the body portion relative to the head portion due to application of the displacement force to the body portion, and the engagement sleeve extends into the head portion to engage the shoulder to position the second valve in the opened position and to conduct fuel vapor from the second aperture to the first apertures when the controller housing is coupled to the fuel vapor vent apparatus.

6. The fuel tank vent system of claim 1, wherein the vent controller includes frangible means for allowing a body portion included in the controller housing to separate from a head portion that is included in the controller housing and is coupled to the fuel vapor vent apparatus in response to displacement of the body portion relative to the fuel vapor vent apparatus due to application of the displacement force to the body portion.

7. The fuel tank vent system of claim 6, wherein the frangible means is an annular V-shaped groove formed in the controller housing between the body portion and the head portion.

8. The fuel tank vent system of claim 7, wherein the head portion includes a ring-receiving groove and an O-ring positioned in the ring-receiving groove and the V-shaped groove is positioned below the ring-receiving groove.

9. A fuel tank vent system comprising
   a fuel vapor vent apparatus adapted to be coupled to a fuel tank to discharge fuel vapor located in the fuel tank to an external destination outside the fuel tank,
   a first vent controller including a controller housing coupled to the fuel vapor vent apparatus and a first valve positioned in the controller housing and adapted to control discharge of fuel vapor from the fuel tank through the fuel vapor vent apparatus to the external destination and block discharge of liquid fuel from the fuel tank through the fuel vapor vent apparatus to the external destination, and
   a second vent controller mounted for movement relative to the fuel vapor vent apparatus from an opened position allowing discharge of fuel vapor from the fuel tank through the fuel vapor vent apparatus to the external destination to a closed position blocking discharge of fuel vapor and liquid fuel from the fuel tank through the fuel vapor vent apparatus to the external destination in response to displacement of at least a portion of the controller housing relative to the fuel vapor vent apparatus.

10. The fuel tank vent system of claim 9, wherein the fuel vapor vent apparatus includes a valve seat, the first vent controller includes a controller housing coupled to the fuel vapor vent apparatus and a first valve contained in the controller housing, the second vent controller includes a second valve and a spring arranged to move the second valve toward the valve seat to establish a sealed connection between the second valve and the valve seat in response to displacement of at least a portion of the controller housing relative to the fuel vapor vent apparatus.

11. The fuel tank vent system of claim 10, wherein the fuel vapor vent apparatus includes a receiver receiving the second valve and the spring and a retainer retaining the second valve and the spring in the receiver, the retainer includes the valve seat and a seat mount coupled to the valve seat and the receiver, and the controller housing is arranged to extend into the seat mount to establish a sealed connection between the first vent controller and the seat mount.

12. The fuel tank vent system of claim 9, wherein the second vent controller includes a valve arranged to move in the fuel vapor vent apparatus relative thereto between an opened position allowing discharge of fuel vapor from the fuel tank through the fuel vapor vent apparatus to the external destination when the first vent controller is coupled to the fuel vapor vent apparatus and a closed position blocking discharge of fuel vapor and liquid fuel from the fuel tank through the fuel vapor vent apparatus to the external destination when the at least the portion of the first vent controller is displaced from the fuel vapor vent apparatus.

13. The fuel tank vent system of claim 12, wherein the second vent controller includes a valve opener arranged to engage the first vent controller to move the valve from the closed position to the opened position upon coupling of the first vent controller to the fuel vapor vent apparatus.

14. The fuel tank vent system of claim 12, wherein the second vent controller includes a valve closer arranged to move the valve from the opened position to the closed position in response to displacement of the at least the portion of the first vent controller.

15. The fuel tank vent system of claim 12, wherein the second vent controller includes shuttle and a valve closer, the shuttle includes the valve, a valve opener, and a follower, the valve closer is arranged to move the valve from the opened position to the closed position in response to displacement of the at least the portion of the first vent controller, the valve opener is arranged to engage the first vent controller to move the valve from the closed position to the opened position upon coupling of the first vent controller to the fuel vapor vent apparatus, and the follower is arranged to slide along an interior surface included in the fuel vapor vent apparatus to guide movement of the valve along a controller axis between the opened position and the closed position.

16. The fuel tank vent system of claim 15, wherein the valve includes a disk and an O-ring coupled to the disk, the valve opener underlies the disk and includes an engagement sleeve arranged to engage the first vent controller and a plurality of connector arms connecting the disk and the engagement sleeve, the valve closer is a spring positioned above and engaging the disk, and the follower is a follower sleeve extending upwardly from the disk to surround the spring and engage the interior surface.

17. The fuel tank vent system of claim 9, wherein the first vent controller includes a frangible portion configured to break in response to displacement of the at least the portion of the first vent controller relative to the fuel vapor vent apparatus.

18. The fuel tank vent system of claim 17, wherein the frangible portion is an annular V-shaped groove.

19. The fuel tank vent system of claim 9, wherein the first vent controller includes a controller housing coupled to the fuel vapor vent apparatus and a valve positioned in the controller housing and the second vent controller is arranged to move from the opened position to the closed position in response to the displacement of at least a portion of the controller housing relative to the fuel vapor vent apparatus upon deformation of the fuel tank caused by an impact against the fuel tank.

20. A fuel tank vent system comprising
   a fuel vapor vent apparatus formed to include an outlet passageway and adapted to be coupled to a fuel tank to cover a tank aperture formed in the fuel tank to discharge fuel vapor located in the fuel tank through the tank aperture and the outlet passageway to an external destination outside the fuel tank,
   a first vent controller including a controller housing coupled to the fuel vapor vent apparatus and a first valve adapted to control discharge of fuel vapor from the fuel tank through the tank aperture and the outlet passageway to the external destination and block discharge of liquid fuel from the fuel tank through the tank aperture and the outlet passageway to the external destination, and
   a second vent controller positioned above the first vent controller in the outlet passageway, the second vent controller including a second valve, a valve opener, and a valve closer, the second valve being mounted for movement relative to the fuel vapor vent apparatus along a controller axis between an opened position allowing discharge of fuel vapor from the fuel tank through the tank aperture and the outlet passageway to the external destination when the controller housing is coupled to the fuel vapor vent apparatus and a closed position blocking discharge of fuel vapor and liquid fuel from the fuel tank through the tank aperture and the outlet passageway to the external destination, the valve opener being arranged to move the second valve from the closed position to the opened position upon coupling of the controller housing to the fuel vapor vent apparatus, the valve closer being arranged to move the second valve from the opened position to the closed position in response to displacement of at least a portion of the controller housing relative to the fuel vapor vent apparatus due to application of a displacement force to the at least the portion of the controller housing in a direction transverse to the controller axis.

21. The fuel tank vent system of claim 20, wherein the fuel vapor vent apparatus includes a valve seat and the second valve includes a disk and an O-ring, the disk includes a peripheral portion formed to include an annular groove receiving the O-ring, and the O-ring is arranged to engage the valve seat when the second valve is positioned in the closed position and to disengage the valve seat when the second valve is positioned in the opened position.

22. The fuel tank vent system of claim 20, wherein the controller housing includes an annular shoulder formed to include a controller aperture, the valve opener includes an engagement sleeve and a plurality of connector arms connecting the engagement sleeve and the second valve to define a plurality of opener apertures therebetween, and the engagement sleeve engages the shoulder to position the second valve in the opened position allowing discharge of fuel vapor from the fuel tank through the controller aperture, the engagement sleeve, and the opener apertures to the external destination when the controller housing is coupled to the fuel vapor vent apparatus.

23. The fuel tank vent system of claim 20, wherein the valve closer is a spring, the fuel vapor vent apparatus includes a container and a tube, the container contains the second valve and the valve closer in a chamber formed in the container, the tube is coupled to an annular side wall included in the container at a transition aperture formed in the side wall so that a tube axis of the tube is transverse to the controller axis which extends through the chamber, the side wall extends away from the first vent controller to a top wall included in the container to provide the chamber with a spring space defined between the side wall and the top wall, the spring is positioned in the spring space, and the second vent controller includes a follower sleeve surrounding the spring and engaging the side wall to slide along the side wall to guide the second valve along the controller axis upon movement of the second valve between the opened position and the closed position.

24. The fuel tank vent system of claim 20, wherein the second valve includes a disk, the valve opener includes an engagement sleeve arranged to engage the first vent controller when the first vent controller is coupled to the fuel vapor vent apparatus and a plurality of spaced-apart connector arms connecting the disk and the engagement sleeve, the valve closer is a spring, and the second vent controller includes a follower sleeve coupled to the disk and engaging the fuel vapor vent apparatus to slide along the fuel vapor vent apparatus to guide the disk along the controller axis upon movement of the valve between the opened position and the closed position.

25. The fuel tank vent system of claim 20, wherein the controller housing includes a body portion that contains the first valve and is coupled to the fuel vapor vent apparatus, a head portion that is narrower than the body portion and extends into the outlet passageway to establish a sealed connection between the head portion and the fuel vapor vent apparatus, and a V-shaped groove located between the body portion and the head portion and the V-shaped groove is configured to break in response to displacement of the body portion relative to the head portion and the fuel vapor vent apparatus due to application of the displacement force to the body portion.

26. The fuel tank vent system of claim 25, wherein the body portion includes a shoulder extending radially inwardly relative to the head portion and the second vent controller includes an engagement sleeve surrounded by the head portion and engaging the shoulder to position the valve in the opened position when the body portion is coupled to the fuel vapor vent apparatus.

27. The fuel tank vent system of claim 20, wherein the second valve is positioned between the valve opener and the valve closer.

28. The fuel tank vent system of claim 20, wherein the valve opener is positioned between the first valve and the second valve.

29. A fuel tank vent system comprising
a fuel vapor vent apparatus adapted to be coupled to a fuel tank to discharge fuel vapor located in the fuel tank to an external destination outside the fuel tank,
a first vent controller coupled to the fuel vapor vent apparatus and adapted to control discharge of fuel vapor from the fuel tank through the fuel vapor vent apparatus to the external destination and block discharge of liquid fuel from the fuel tank through the fuel vapor vent apparatus to the external destination, and
a second vent controller mounted for movement relative to the fuel vapor vent apparatus from an opened position allowing discharge of fuel vapor from the fuel tank through the fuel vapor vent apparatus to the external destination to a closed position blocking discharge of fuel vapor and liquid fuel from the fuel tank through the fuel vapor vent apparatus to the external destination in response to disablement of the first vent controller.

30. The fuel tank vent system of claim 29, wherein the first vent controller includes a controller housing coupled to the fuel vapor vent apparatus and a first valve positioned in the controller housing and the second vent controller includes a second valve arranged to move in the fuel vapor vent apparatus from the opened position to the closed position in response to displacement of at least a portion of the controller housing relative to the fuel vapor vent apparatus.

* * * * *